(12) United States Patent
Carsello

(10) Patent No.: US 7,231,190 B2
(45) Date of Patent: Jun. 12, 2007

(54) METHOD AND APPARATUS FOR TERMINATING RECEPTION IN A WIRELESS COMMUNICATION SYSTEM

(75) Inventor: Stephen R. Carsello, Plantation, FL (US)

(73) Assignee: Motorola, Inc., Schaumburg, IL (US)

( * ) Notice: Subject to any disclaimer, the term of this patent is extended or adjusted under 35 U.S.C. 154(b) by 571 days.

(21) Appl. No.: 10/628,815

(22) Filed: Jul. 28, 2003

(65) Prior Publication Data
US 2005/0026582 A1    Feb. 3, 2005

(51) Int. Cl.
*H04B 1/04* (2006.01)
*H03C 3/00* (2006.01)
(52) U.S. Cl. .................. 455/110; 375/132; 375/303
(58) Field of Classification Search ............. 455/110, 455/226.1, 226.2, 226.3, 227, 214, 263; 375/132, 375/133, 134, 135, 136, 137, 138, 302, 303, 375/322, 324, 329, 340
See application file for complete search history.

(56) References Cited

U.S. PATENT DOCUMENTS

| | | | |
|---|---|---|---|
| 5,581,548 A * | 12/1996 | Ugland et al. .............. 375/138 |
| 5,884,257 A | 3/1999 | Maekawa et al. ............ 704/248 |
| 6,038,238 A * | 3/2000 | Jokinen et al. .............. 375/130 |
| 6,058,137 A * | 5/2000 | Partyka ....................... 375/131 |
| 6,321,197 B1 | 11/2001 | Kushner et al. |
| 6,335,946 B1 * | 1/2002 | Winnberg .................... 375/132 |
| 6,850,765 B2 * | 2/2005 | Wasko ......................... 455/118 |
| 7,054,287 B2 * | 5/2006 | Mucke ......................... 370/329 |

FOREIGN PATENT DOCUMENTS

KR    2001-0011066    2/2001

\* cited by examiner

*Primary Examiner*—Quochien B. Vuong

(57) ABSTRACT

A receiver front end (302) receives a known Stop Waveform (114) comprising a predetermined symbol pattern on a voice channel, the Stop Waveform sent at the end of a transmission. A processor (304) coupled to the receiver front end terminates (512) the reception of the voice channel in response to detecting the Stop Waveform. The processor computes (504) a plurality of characteristics derived from the received signal, including a carrier-to-noise ratio, a maximum normalized symbol correlation energy over all symbols of the Stop Waveform, and a number of small and a number of large normalized symbol energy values. The processor detects (506) the Stop Waveform by comparing the plurality of characteristics with a corresponding plurality of predetermined thresholds.

20 Claims, 2 Drawing Sheets

METHOD AND APPARATUS FOR TERMINATING RECEPTION IN A WIRELESS COMMUNICATION SYSTEM

FIELD OF THE INVENTION

This invention relates in general to wireless data communication systems, and more specifically to a method and apparatus in a wireless communication system for facilitating a termination of reception of a received signal on a voice channel simultaneously with an end of a transmission.

BACKGROUND OF THE INVENTION

In a dispatch voice communication system, messages are transmitted at random times, by an originating voice communication device, and exhibit random duration. The target communication device, upon detecting that a transmission is being received, synchronizes to the originator's transmission, and, preferably, decodes the transmission for the duration of the voice message. In most cases, the voice message is delivered to the target device in real time, and played out through a speaker or earphone. Often, in a wireless communication system, the voice channel becomes unreliable during the course of the transmission, and the target device may not be able to determine whether the transmission has ended or not. In the case when the target has lost the originator's transmission, and is not sure if this transmission is still in progress, the target may decide to drop the call, and go back to monitoring an acquisition channel for new transmissions. This can result in many transmissions being dropped prematurely by the target device. Alternatively, the target may continue to decode the voice channel, but without a reliable received signal. In many cases, this will result in the target hanging on to the voice channel for too long, and potentially missing other transmissions, which can occur on the acquisition channel. Clearly, a more robust solution is needed for ending dispatch voice transmissions on erratic communication channels.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages in accordance with the present invention.

DETAILED DESCRIPTION OF THE PREFERRED EMBODIMENTS

Figure 1:
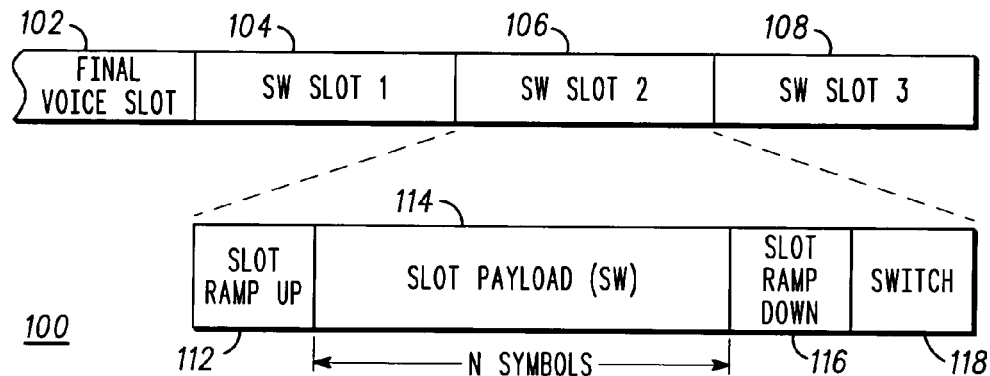
FIG. 1 is a timing diagram of an exemplary transmission in accordance with the present invention.

In overview, the present disclosure concerns communications systems that utilize transmitters and receivers to provide service for communication units or more specifically for users thereof operating therein. More particularly, various inventive concepts and principles embodied as a method and apparatus in a wireless communication system for facilitating a termination of reception of a received signal on a voice channel simultaneously with an end of a transmission for use in equipment with such communications systems will be discussed and disclosed. The communications systems of particular interest are those being deployed and developed to provide voice communications through digital modulation and coding, and more particularly to wireless digital voice communication systems employing M-ary frequency-shift keying (FSK) modulation. An example is the iDEN™ systems and evolutions thereof available from Motorola, Inc., although the concepts and principles have application in other systems and devices as well.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions.

Much of the inventive functionality and many of the inventive principles are best implemented with or in one or more conventional digital signal processors (DSPs), or with integrated circuits (ICs) such as custom or application specific ICs. It is expected that one of ordinary skill, when guided by the concepts and principles disclosed herein, will be readily capable of programming such DSPs, or generating such ICs with minimal experimentation. Therefore, in the interest of brevity and minimization of any risk of obscuring the principles and concepts according to the present invention, further discussion of such programs, DSPs, and ICs, if any, will be limited to the essentials with respect to the principles and concepts employed by the preferred embodiments.

An inventive solution to the problem that was described herein in the Background of the Invention involves the advantageous transmission of a unique Stop Waveform, or post-amble, by the originating device, which, when detected, indicates that the voice transmission is complete. The Stop Waveform preferably will be very reliable, with the capability of being detected at extremely low signal-to-noise ratios, so that the target may detect the stop waveform even when the channel quality is extremely poor. This gives the target the ability to continue to monitor the voice channel, with the confidence that the Stop Waveform is difficult to miss. This solution, when executed properly, will improve the situation significantly, since the target will, with high reliability, monitor the voice channel only while the transmission is occurring, and, also with high reliability, terminate the reception at the same time that the originator terminates the transmission, thereby enabling the target to monitor the acquisition channel at the proper instant. In order to provide a robust solution, the Stop Waveform must be capable of being detected when time and frequency drift occur between the originator and target devices. In addition, the Stop Waveform detector must be able to detect signals at very low carrier to noise (C/N), while, at the same time, exhibiting immunity to false detection of undesired signals known to occur within the band of interest.

Referring to FIG. 1, a timing diagram 100 of an exemplary transmission depicts the transmitted signal format at the end of each voice transmission, wherein the final voice slot 102 is followed by three Stop Waveform slots 104, 106, 108. The Stop Waveform itself occupies the payload section 114 of N data symbols, and comprises the majority of the Stop Waveform slot. Short slot ramp-up 112 and ramp-down 116 sections, as well as a frequency-hop switching 118 interval, are also contained within the Stop Waveform slot. N is preferably a large number, and also preferably a power-of-2, e.g., N=128.

By transmitting the Stop Waveform slot three times, consecutively, on three independent frequency hops, we provide third-order diversity for the Stop Waveform, thus making it more reliable in fringe channel conditions.

The Stop Waveform preferably is constructed by modulating a sequence, which is known to both the transmitter and receiver, as an M-ary FSK signal, according to $$s(t) = \exp\left(j\pi h \sum_{m=0}^{N-1} u_m q(t-mT)\right),$$

where h is the modulation index, T is the symbol duration, $\{u_m\}$ is the known transmitted data sequence, and q(t) is the normalized phase pulse $$q(t) = \begin{cases} 0 & t < 0 \\ t/T & 0 \le t \le T \\ 1 & t > T \end{cases}.$$

It can be shown that, during symbol interval m, the modulated phase is given by $$\theta_m(\tau) = \angle s(\tau + mT) = \frac{\pi h u_m \tau}{T} + \pi h \sum_{i<m} u_i,$$

for $0 \le \tau \le T$. Inspection of this equation reveals that, during symbol interval m, the transmitted signal is merely a sinusoid of known frequency, determined by the known symbol value $u_m$, and of known starting phase, determined by the known symbol sequence $$\{u_i\}|_{i=0}^{m-1}.$$

In one embodiment, the M-ary FSK voice data symbols are formed of odd symbol values, e.g., u=[+7 −3 +3 −1 −1 −7 +5 +1 . . . ].

In that embodiment, preferably, the stop waveform symbols are formed of even values, so as to produce low cross-correlation with random M-ary FSK voice data, i.e., each symbol in the vector u is from the set

{−6 −4 −2 0 +2 +4 +6}.

Furthermore, to avoid problems related to DC offsets, we also make the Stop Waveform orthogonal, and therefore impervious, to DC offsets by drawing symbols only from the set

{−6 −4 −2 +2 +4 +6}.

Figure 2:
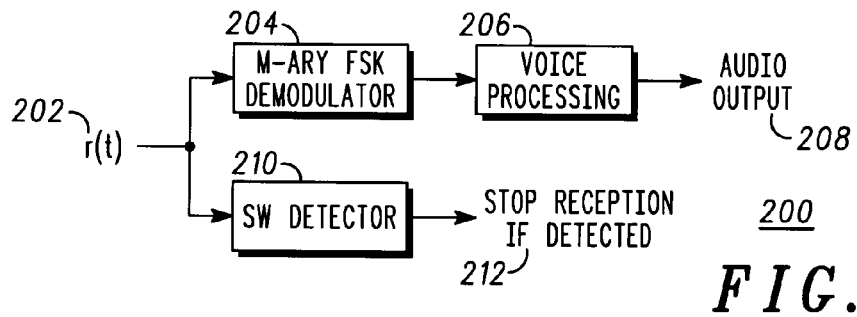
FIG. 2 is a high-level functional block diagram of an exemplary receiver in accordance with the present invention.

FIG. 2 is a high-level functional block diagram 200 of an exemplary receiver that is operable in accordance with the concepts and principles discussed herein. Note that the receiver preferably processes a received signal 202 in two parallel paths, the first of which is the demodulator 204 for the M-ary FSK voice data, followed by the voice decoding and processing functions 206, which produce an audio output 208. The second path is the Stop Waveform detector 210, which can interrupt the voice processing function with a detection signal 212, and terminate the message when the Stop Waveform is detected. Based on this mode of operation, it is clearly evident that the Stop Waveform detector should not falsely detect the Stop Waveform when random M-ary FSK data appears on the channel. In fact, there are many types of signals, besides additive white Gaussian noise (AWGN), against which we desire a very low false detection probability for the Stop Waveform detector. The obvious signals are wideband noise, narrowband jammers, and known signal types within the existing system, i.e., other types of slot formats, which are transmitted in, for example, a "Talk-Around" mode.

In a first embodiment, the basis for the Stop Waveform detector is maximum likelihood detection of a known signal with unknown phase in AWGN, i.e., noncoherent detection, in which the following correlation $$C = \left|\frac{1}{NT}\int_0^{NT} r(t)s^*(t)dt\right|^2,$$

where r(t) is the received signal and s(t) is the known transmitted signal, is compared to a threshold η. If the correlation C exceeds the threshold η, then the Stop Waveform signal is said to have been detected. It follows that the threshold η is related to the noise power $\sigma_n^2$ and the targeted noise falsing probability $P_f$, according to $$\eta = \frac{\sigma_n^2}{N}\ln\left(\frac{1}{P_f}\right).$$

If a noise estimate $\hat{\sigma}_n^2$ is available to the receiver, then we can formulate the maximum likelihood detector as a carrier-to-noise (C/N) estimate, followed by a threshold test, where the quantity $$\left(\frac{C}{N}\right) = \left(\frac{1}{\hat{\sigma}_n^2}\right)\cdot\left|\frac{1}{NT}\int_0^{NT} r(t)s^*(t)dt\right|^2$$

is compared to the modified threshold $$\eta_{C/N} = \frac{1}{N}\ln\left(\frac{1}{P_f}\right).$$

Note that the C/N threshold $\eta_{C/N}$ increases as the desired noise falsing probability $P_f$ decreases. Similarly, for a fixed noise falsing probability $P_f$, as the number of symbols N in the Stop Waveform increases, the required threshold decreases. For large N, the threshold can get quite small, meaning that the C/N estimate can pass the detector at very small values. In other words, for large N, the Stop Waveform detector can operate at very low C/N.

The development above pertains to a signal received in AWGN with perfect time and frequency synchronization. In this application, the receiver sometimes will have lost the transmitted signal for long enough that synchronization may not be very good when the Stop Waveform appears on the channel. The Stop Waveform detector, therefore, preferably will search over time and frequency within a predetermined range. We start with the correlation C expressed in discrete time $$C = \left| \frac{1}{NN_s} \sum_{n=0}^{NN_s-1} r(n)s^*(n) \right|^2,$$

where $N_s$ is the number of samples per FSK symbol in the receiver. This can be broken down into symbol intervals, and combined according to $$C = \left| \frac{1}{N} \sum_{m=0}^{N-1} e^{-j\theta_m} \lambda(m) \right|^2,$$

with symbol-level correlations $$\lambda(m) = \frac{1}{N_s} \sum_{l=0}^{N_s-1} r(l+mN_s) \exp\left(-j\frac{\pi u_m}{N_s}l\right),$$

and with known initial phases $$\theta_m = \pi h \sum_{i<m} u_i.$$

With frequency error present between the transmitter and receiver, the maximum likelihood detection rule prescribes that we formulate a multiplicity of correlations $\{P_k\}$ at different offset frequencies $\{\omega_k\}$, according to $$P_k = \left| \frac{1}{NN_s} \sum_{n=0}^{NN_s-1} r(n)[s(n)e^{j\omega_k n}]^* \right|^2,$$

which, again, may be broken down into symbol-level correlations $$P_k = \left| \frac{1}{N} \sum_{m=0}^{N-1} e^{-j\theta_m} \lambda(m, \omega_k) \right|^2,$$

where we now require a new set of symbol-level correlations for each offset frequency $\omega_k$, according to $$\lambda(m, \omega_k) = \frac{1}{N_s} \sum_{l=0}^{N_s-1} r(l+mN_s)\exp\left(-j\frac{\pi u_m}{N_s}l\right)\exp[-j\omega_k(l+mN_s)]$$

for $0 \leq m \leq N-1$. Instead of computing these directly, we make the following piece-wise approximation in the detector $$\exp[-j\omega_k(l+mN_s)] \approx \exp(-j\omega_k mN_s),$$

so that $$P_k \approx \left| \frac{1}{N} \sum_{m=0}^{N-1} e^{-j\theta_m} e^{-j\omega_k mN_s} \lambda(m) \right|^2.$$

As long as the frequency mismatch between the transmitter and receiver is small compared to the FSK symbol rate, this approximation provides adequate frequency capture range, with only a small degradation in sensitivity, compared to the optimum detector.

In addition to frequency searching, we introduce time searching into the detector. In the detector, compute the quantities $$\lambda(m, i) = \frac{1}{N_s} \sum_{l=0}^{N_s-1} r(l+mN_s+i)\exp\left(-j\frac{\pi u_m}{N_s}l\right) \text{ for } -i_{max} \leq i \leq i_{max}.$$

Note these are simply the symbol-level correlations computed for different timing offsets. Next, compute the FFT magnitude-squared of the phase-corrected sequence at each timing offset $$P_k(i) \approx \left| \frac{1}{N} \sum_{m=0}^{N-1} e^{-j\theta_m} e^{-j\frac{2\pi km}{N}} \lambda(m, i) \right|^2 \text{ for } -\frac{N}{2} \leq k \leq \frac{N}{2} - 1.$$

For each timing offset i, search over frequency for the peak energy $$k_0(i) = \arg \max_{k \in [-k_{max}, k_{min}]} [P_k(i)],$$

where $k_{max}$ is determined according to the maximum expected one-sided frequency offset $f_{max}$ and the FFT frequency bin resolution, i.e., $$k_{max} = \left\lceil \frac{f_{max}N}{R_s} \right\rceil,$$

where $R_s$ is the FSK symbol rate. Next, for each timing offset i, compute the carrier power according to $$C(i) = \sum_{k=k_0(i)-k_1}^{k_0(i)+k_1} P_k(i),$$

where $k_1$ is based on the maximum one-sided carrier bandwidth $f_1$, i.e., $$k_1 = \left\lceil \frac{f_1 N}{R_s} \right\rceil.$$

The timing offset is then determined $$i_0 = \arg \max_{i \in [-i_{min}, i_{max}]} [C(i)],$$

and the noise power is estimated $$\hat{\sigma}^2 = \left[\sum_{k=-N/2}^{N/2-1} P_k(i_0)\right] - C(i_0).$$

The C/N estimate $C(i_0)/\hat{\sigma}^2$ is then compared to a threshold $\eta_{C/N}$, which is not the same threshold as that developed earlier. The time and frequency searching alter the distribution of the C/N estimate, resulting in a different false alarm probability. Thus, the threshold $\eta_{C/N}$ is preferably determined empirically.

A problem with the first embodiment of the Stop Waveform detector is false detection of unwanted signals, which is summarized below, for the Stop Waveform detector described above with N=128. For several values of static $E_S/N_0$, we show the false alarm probability for various unwanted signal types.

| Signal type | $E_s/N_o$ = −12 dB | $E_s/N_o$ = −4 dB | $E_s/N_o$ = 4 dB | $E_s/N_o$ = 12 dB | $E_s/N_o$ = 20 dB |
|---|---|---|---|---|---|
| Noise only | | | 0.000136 | | |
| 8-FSK w/ 0 Hz offset | 0 | 0.0001 | 0.0001 | 0.0001 | 0.0004 |
| 8-FSK w/ random offset | 0.0001 | 0.0003 | 0.0001 | 0.0041 | 0.0091 |
| Preamble w/ random offset | 0.0003 | 0.0002 | 0.0049 | 0.1080 | 0.2104 |
| Other Stop Waveform with random offset | 0.0001 | 0.0001 | 0.0008 | 0.0065 | 0.0152 |
| Inband jammer with random freq | 0 | 0.0003 | 0.0068 | 0.0703 | 0.1103 |

Note that, while the noise false alarm rate is very low, some signal types produce unacceptably high false alarm rates. Clearly, the "optimum detector", designed for AWGN channels, does not adequately reject other unwanted signal types. The fact that the detector is designed for large N, which results in a very low threshold $\eta_{C/N}$, designed to operate at very low CN, only makes the problem worse.

To eliminate the falsing, in a second embodiment, we introduce another group of tests into the Stop Waveform detector, based on the normalized symbol-level energy sequence $$\beta(m) = \frac{|\lambda(m, i_0)|^2}{e(m)},$$

where e(m) is the received energy over symbol interval m $$e(m) = \frac{1}{N_s}\sum_{l=0}^{N_s-1} |r(l + mN_s)|^2.$$

Note that the numerator of {β(m)} is synchronized to the optimum symbol timing $i_0$, while the denominator is not. In fact, the denominator sequence preferably is synchronized to the nominal, or previously-established symbol timing, which advantageously reduces the computational complexity and storage requirement for the anti-falsing algorithm.

Simulations have demonstrated what happens to the sequence {β(m)} when another Stop Waveform with a different timing offset is received. When the undesired symbols match the desired Stop Waveform, a high correlation occurs, but usually, when they do not match, a very low correlation occurs. This phenomenon occurs for all of the unwanted signal types known to false the Stop Waveform detector.

To reject these signal types, we form the following quantities:

$$\beta_{max} = \max_{m \in [0, N-1]} [\beta(m)]$$

$$\text{flag\_small}(m) = \begin{cases} 1 & \beta(m) < 0.250\beta_{max} \\ 0 & \beta(m) \geq 0.250\beta_{max} \end{cases}$$

$$\text{flag\_large}(m) = \begin{cases} 0 & \beta(m) \leq 0.875\beta_{max} \\ 1 & \beta(m) > 0.875\beta_{max} \end{cases}$$

$$\text{num\_small} = \sum_{m=0}^{N-1} \text{flag\_small}(m)$$

$$\text{num\_large} = \sum_{m=0}^{N-1} \text{flag\_large}(m).$$

To reject these types of signals, the Stop Waveform is said to be detected only when all of the following conditions are met:

1. $\frac{C(i_0)}{\hat{\sigma}^2} > \eta_{C/N}$ 2. (num_small ≤ $\eta_{LO}$) OR ((num_small+num_large) ≤ $\eta_{LO+HI}$)

3. $\beta_{max} > \eta_{max}$

For N=128, we have used the following thresholds with good results:
1. $\eta_{C/N}$ = 0.175
2. $\eta_{LO}$ = 64
3. $\eta_{LO+HI}$ = 85
4. $\eta_{max}$ = 0.375

The table below shows the new false alarm performance with these anti-falsing algorithms in place. Note that the performance is now very good.

| Signal type | $E_s/N_o$ = −12 dB | $E_s/N_o$ = −4 dB | $E_s/N_o$ = 4 dB | $E_s/N_o$ = 12 dB | $E_s/N_o$ = 20 dB |
|---|---|---|---|---|---|
| Noise only | | | 0 | | |
| 8-FSK w/ 0 Hz offset | 0 | 0 | 0 | 0 | 0 |
| 8-FSK w/ random offset | 0 | 0 | 0 | 0 | 0 |
| Preamble w/ random offset | 0 | 0 | 0.0005 | 0 | 0 |
| Other Stop Waveform with random offset | 0 | 0.0001 | 0.0001 | 0.0009 | 0.0003 |
| Inband jammer with random freq | 0 | 0 | 0.0002 | 0 | 0 |

Figure 3:
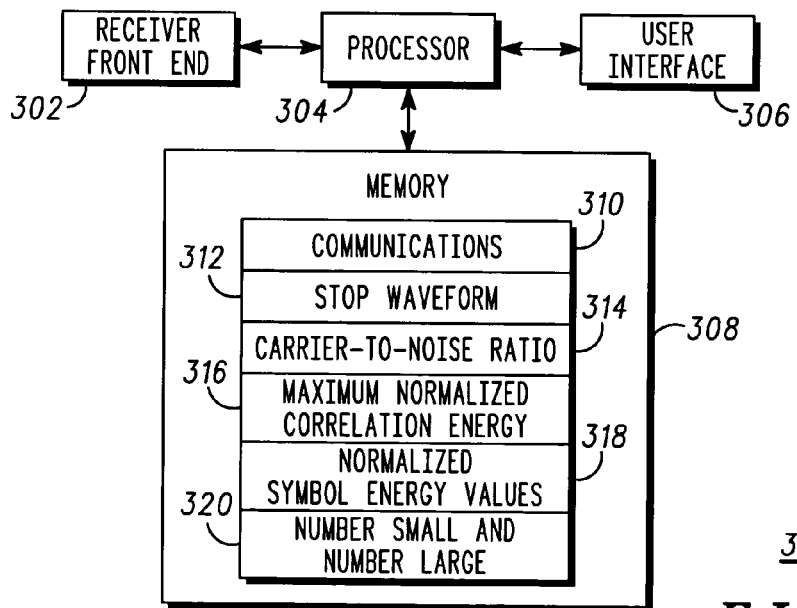
FIG. 3 is an electrical block diagram of the receiver in accordance with the present invention.

Referring to FIG. 3, an electrical block diagram depicts a receiver 300 for a wireless communication system in accordance with the present invention. The receiver 300 comprises a conventional receiver front end 302 for receiving a known Stop Waveform comprising a predetermined symbol pattern on the voice channel, the Stop Waveform sent at the end of a transmission. The receiver front end 302 is preferably similar to the receiver front end utilized in the iDEN handset available from Motorola, Inc. The receiver 300 further comprises a processor 304 coupled to the receiver front end 302 and programmed to terminate the reception of the voice channel in response to detecting the Stop Waveform. The processor 304 is preferably a conventional digital signal processor (DSP) similar to a DSP56000 processor available from Motorola, Inc. The receiver 300 also includes a user interface 306 coupled to the processor 304 and preferably including user controls and a conventional speaker for generating an audible voice message. The receiver 300 further comprises a conventional memory 308 for storing executable software programs for programming the processor 304 in accordance with the present invention.

The memory 308 comprises a conventional communications program 310 for programming the processor 304 to cooperate with the receiver front end 302 to communicate according to a communication protocol utilized in the communication system. The memory 308 further comprises a Stop Waveform program 312 for programming the processor 304 to detect the Stop Waveform in accordance with the concepts and principles discussed herein. In addition, the memory 308 includes space for storing a plurality of characteristics derived from the received signal by the processor 304. The plurality of characteristics include a carrier-to-noise ratio 314, a maximum normalized correlation energy value 316, and a number of small and a number of large normalized symbol energy values 320. The memory 308 also includes a location for storing the normalized symbol energy values 318. The Stop Waveform program 312 preferably programs the processor 304 to detect the Stop Waveform by comparing the plurality of characteristics with a corresponding plurality of predetermined thresholds, as disclosed herein above.

Figure 4:
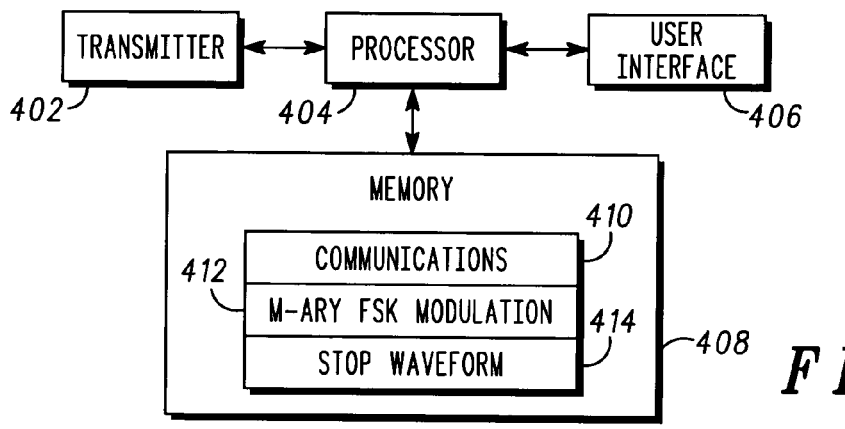
FIG. 4 is an electrical block diagram of an exemplary wireless communication transmission device in accordance with the present invention.

FIG. 4 is an electrical block diagram of an exemplary wireless communication transmission device 400 for a wireless communication system. The transmission device 400 comprises a conventional transmitter 402 for transmitting a wireless communication signal. The transmitter 402 is preferably similar to that utilized in the iDEN™ handset available from Motorola, Inc. The transmission device 400 further comprises a conventional processor 404 coupled to the transmitter 402 for controlling the transmitter 402. The processor 404 is preferably a digital signal processor (DSP) similar to the DSP56600 available from Motorola, Inc. The transmission device 400 further comprises a conventional user interface 406 coupled to the processor 404 for interfacing with a user. The user interface preferably comprises conventional user controls and a microphone for inputting a voice message. The transmission device 400 further comprises a conventional memory 408 for storing executable software programs for programming the processor 404.

The memory 408 includes a conventional communications program 410 for programming the processor 404 to cooperate with the transmitter 402 to communicate according to the communication protocol utilized in the communication system. The memory also includes a Stop Waveform program 414 for programming the processor 404 to control the transmitter 402 to transmit a predetermined Stop Waveform at the end of a transmission in a plurality of consecutive time slots on a plurality of independent frequency hops. The memory 408 further comprises an M-ary frequency-shift keyed modulation program 412 for controlling the transmitter 402 to modulate the Stop Waveform as an M-ary frequency-shift-keyed (FSK) signal that preferably utilizes only symbol values that are not utilized for transmitting voice message data. It will be appreciated that, alternatively, portions of the receiver 300 and portions of the transmission device 400 can be combined to form a two-way communication device.

Figure 5:
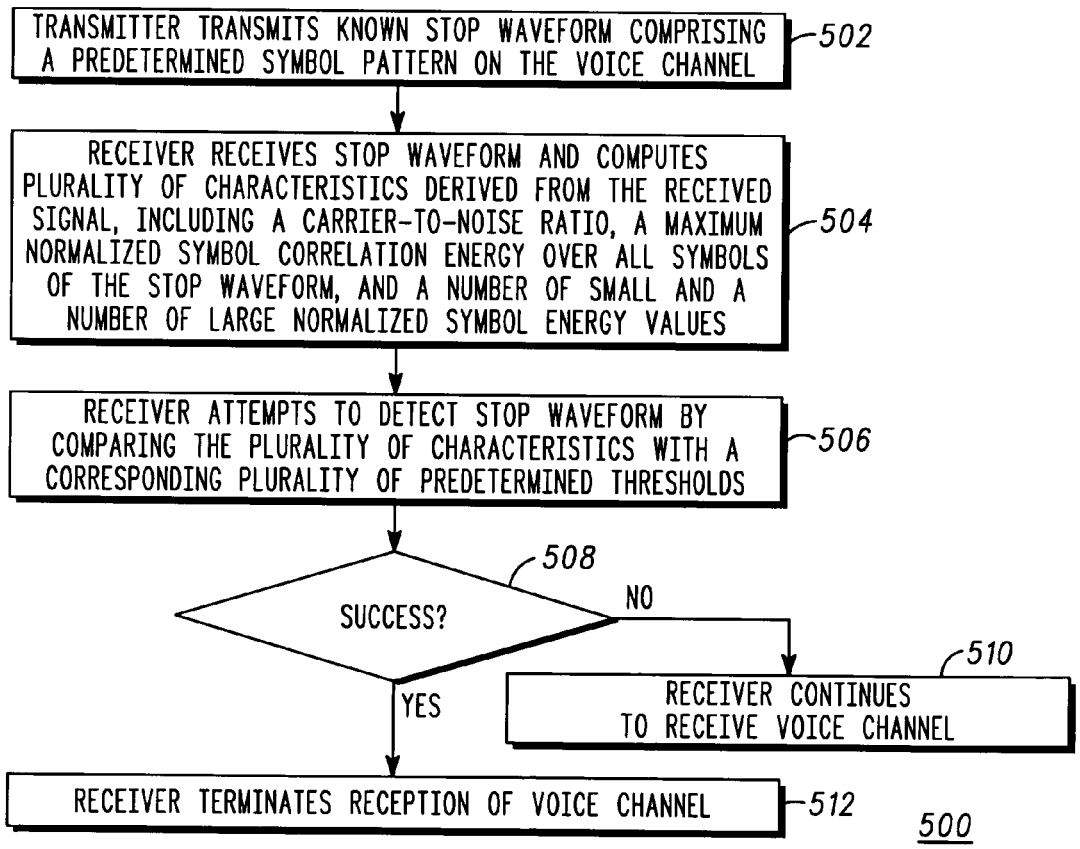
FIG. 5 is a flow diagram depicting a method in accordance with the present invention.

FIG. 5 is a flow diagram 500 depicting a method of advantageously terminating reception in accordance with the present disclosure. The method is used in a wireless communication system for facilitating a termination of reception of a received signal on a voice channel simultaneously with an end of a transmission on the voice channel. While described with reference to the structures of FIG. 3 and FIG. 4, the method may be practiced with other devices and structures as well. The flow begins with transmitting 502, by the transmission device 400, a known Stop Waveform comprising a predetermined symbol pattern on the voice channel. The receiver 300 receives the Stop Waveform and computes 504 a plurality of characteristics derived from the received signal. The plurality of characteristics include a carrier-to-noise ratio, a maximum normalized symbol correlation energy over all symbols of the Stop Waveform, and a number of small and a number of large normalized symbol energy values. The receiver 300 then attempts 506 to detect the Stop Waveform by comparing the plurality of characteristics with a corresponding plurality of predetermined thresholds. When the receiver 300 succeeds in detecting the Stop Waveform at step 508, the receiver 300 terminates 512 the reception of the voice channel in response to detecting the Stop Waveform. Otherwise, the receiver 300 continues 510 to receive the voice channel.

In transmitting the Stop Waveform, the transmission device 400 preferably modulates the Stop Waveform as an M-ary frequency-shift-keyed (FSK) signal, and the receiver 300 preferably computes the carrier-to-noise ratio by breaking down a waveform correlation between the received signal and the known Stop Waveform into symbol-level correlations, based on the predetermined symbol pattern with expected symbol deviation frequencies, at different timing offsets. The receiver 300 then, for each of the different timing offsets, phase-corrects the symbol-level correlations according to a known modulation index and the predetermined symbol pattern, thereby producing a plurality of phase-corrected symbol-level correlation sequences.

The receiver 300 continues to compute the carrier-to-noise ratio by, for each timing offset, computing a Fourier transform magnitude-squared of the plurality of phase-corrected symbol-level correlation sequences. The receiver 300 continues by, for each timing offset, performing a frequency search, over a predetermined range, for a maximum energy peak in the Fourier transform, corresponding to the timing offset. Next, the receiver 300, for each timing offset, computes the carrier power, by summing up the Fourier transform magnitude-squared over multiple bins, centered about a frequency bin where the maximum energy peak has occurred. The receiver 300 then determines an optimum timing offset based on a maximum carrier power, and computes a noise power by summing the Fourier transform magnitude-squared, corresponding to the optimum timing offset, over all remaining bins that were not used for computing the carrier power. The maximum carrier power divided by the noise power is the carrier-to-noise ratio.

The receiver 300 next computes the maximum normalized symbol correlation energy over all symbols of the Stop Waveform by forming a normalized symbol correlation energy sequence, by taking a magnitude-squared of each of the symbol-level correlations, for each symbol interval, corresponding to said optimum timing offset, and dividing by a received signal power over the same symbol interval, where the denominator term uses a timing offset corresponding to a nominal symbol timing.

The receiver 300 then computes the number of small and the number of large normalized symbol energy values over all symbols of the Stop Waveform, wherein a normalized symbol correlation energy value is said to be small if it is less than the maximum normalized symbol correlation energy scaled by a predetermined value that is less than unity, and wherein a normalized symbol correlation energy value is said to be large if it is greater than the maximum normalized symbol correlation energy scaled by a predetermined value that is less than unity.

Thus, it should be clear that the present invention advantageously provides a method and apparatus for facilitating a termination of reception of a received signal on a channel simultaneously with an end of a transmission. The method and apparatus advantageously provides a robust solution for ending transmissions, such as dispatch voice transmissions, on erratic communication channels.

This disclosure explains how to fashion and use various embodiments in accordance with the invention rather than to limit the true, intended, and fair scope thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

The invention claimed is:

1. A wireless communication receiver for facilitating a termination of reception of a received signal on a voice channel simultaneously with an end of a transmission on the voice channel, the wireless communication receiver comprising:
a receiver front end for receiving a known Stop Waveform comprising a predetermined symbol pattern on the voice channel, the Stop Waveform sent at the end of the transmission; and
a processor coupled to the receiver front end and programmed to terminate the reception of the voice channel in response to detecting the Stop Waveform,
wherein the processor is further programmed to:
compute a plurality of characteristics derived from the received signal, including:
a carrier-to-noise ratio;
a maximum normalized symbol correlation energy over all symbols of the Stop Waveform; and
a number of small and a number of large normalized symbol energy values; and
detect the Stop Waveform by comparing the plurality of characteristics with a corresponding plurality of predetermined thresholds.

2. The receiver of claim 1,
wherein the Stop Waveform is modulated as an M-ary frequency-shift-keyed (FSK) signal, and
wherein the processor is further programmed to compute the carrier-to-noise ratio by breaking down a waveform correlation between the received signal and the known Stop Waveform into symbol-level correlations, based on the predetermined symbol pattern with expected symbol deviation frequencies, at different timing offsets.

3. The receiver of claim 2, wherein the processor is further programmed to compute the carrier-to-noise ratio by, for each of the different timing offsets, phase-correcting said symbol-level correlations according to a known modulation index and the predetermined symbol pattern, thereby producing a plurality of phase-corrected symbol-level correlation sequences.

4. The receiver of claim 3, wherein the processor is further programmed to compute the carrier-to-noise ratio by, for each timing offset, computing a Fourier transform magnitude-squared of the plurality of phase-corrected symbol-level correlation sequences.

5. The receiver of claim 4, wherein the processor is further programmed to compute the carrier-to-noise ratio by, for each timing offset, performing a frequency search, over a predetermined range, for a maximum energy peak in the Fourier transform, corresponding to the timing offset.

6. The receiver of claim 5, wherein the processor is further programmed to compute the carrier-to-noise ratio by, for each timing offset, computing the carrier power, by summing up the Fourier transform magnitude-squared over multiple bins, centered about a frequency bin where the maximum energy peak has occurred.

7. The receiver of claim 6, wherein the processor is further programmed to compute the carrier-to-noise ratio by determining an optimum timing offset based on a maximum carrier power.

8. The receiver of claim 7, wherein the processor is further programmed to compute the carrier-to-noise ratio by computing a noise power by summing the Fourier transform magnitude-squared, corresponding to the optimum timing offset, over all remaining bins that were not used for computing the carrier power.

9. The receiver of claim 8, wherein the processor is further programmed to compute said maximum normalized symbol correlation energy over all symbols of the Stop Waveform by forming a normalized symbol correlation energy sequence, by taking a magnitude-squared of each of the symbol-level correlations, for each symbol interval, corresponding to said optimum timing offset, and dividing by a received signal power over the same symbol interval, where the denominator term uses a timing offset corresponding to a nominal symbol timing.

10. The receiver of claim 9, wherein the processor is further programmed to compute said number of small and said number of large normalized symbol energy values over all symbols of the Stop Waveform, wherein a normalized symbol correlation energy value is said to be small if it is less than said maximum normalized symbol correlation energy scaled by a first predetermined value that is less than unity, and wherein a normalized symbol correlation energy value is said to be large if it is greater than said maximum normalized symbol correlation energy scaled by a second predetermined value that is less than unity.

11. A wireless communication transmission device for facilitating a termination of reception of a received signal on a voice channel simultaneously with an end of a transmission on the voice channel, the wireless communication transmitter comprising:
a transmitter for transmitting a wireless communication signal; and
a processor coupled to the transmitter for controlling the transmitter, wherein the processor is programmed to control the transmitter to transmit a predetermined Stop Waveform at the end of the transmission in a plurality of consecutive time slots on a plurality of independent frequency hops, wherein the Stop Waveform is configured to cause a receiving unit to terminate the reception of the wireless communication signal.

12. The wireless communication transmission device of claim 11, wherein the processor is further programmed to control the transmitter to modulate the Stop Waveform as an M-ary frequency-shift-keyed (FSK) signal that utilizes only symbol values that are not utilized for transmitting voice message data.

13. The wireless communication transmission device of claim 12, wherein the processor is further programmed to omit using a DC-level symbol in the Stop Waveform, thereby making the Stop Waveform orthogonal, and therefore impervious, to DC offsets.

14. A method in a wireless communication device for facilitating a termination of reception of a received signal simultaneously with an end of a transmission on a channel, the method comprising:
receiving the received signal corresponding to a known Stop Waveform comprising a predetermined symbol pattern on the channel;
computing a plurality of characteristics derived from the received signal, including:
a carrier-to-noise ratio;
a maximum normalized symbol correlation energy over all symbols of the Stop Waveform; and
a number of small and a number of large normalized symbol energy values;
detecting the Stop Waveform by comparing the plurality of characteristics with a corresponding plurality of predetermined thresholds; and
terminating the reception of the channel in response to detecting the Stop Waveform.

15. The method of claim 14,
wherein the known Stop Waveform is modulated as an M-ary frequency-shift-keyed (FSK) signal; and
wherein the computing the carrier-to-noise ratio further comprises computing the carrier-to-noise ratio by breaking down a waveform correlation between the received signal and the known Stop Waveform into symbol-level correlations, based on the predetermined symbol pattern with expected symbol deviation frequencies, at different timing offsets.

16. The method of claim 15, further comprising;
computing the carrier-to-noise ratio by, for each of the different timing offsets, phase-correcting said symbol-level correlations according to a known modulation index and the predetermined symbol pattern, thereby producing a plurality of phase-corrected symbol-level correlation sequences.

17. The method of claim 16, further comprising;
computing the carrier-to-noise ratio by, for each timing offset, computing a Fourier transform magnitude-squared of the plurality of phase-corrected symbol-level correlation sequences.

18. The method of claim 17, further comprising;
computing the carrier-to-noise ratio by, for each timing offset, performing a frequency search, over a predetermined range, for a maximum energy peak in the Fourier transform, corresponding to the timing offset.

19. The method of claim 18, further comprising;
computing the carrier-to-noise ratio by, for each timing offset, computing the carrier power, by summing up the Fourier transform magnitude-squared over multiple bins, centered about a frequency bin where the maximum energy peak has occurred.

20. The method of claim 19, further comprising: computing the carrier-to-noise ratio by;
determining an optimum timing offset based on a maximum carrier power;
computing a noise power by summing the Fourier transform magnitude-squared, corresponding to the optimum timing offset, over all remaining bins that were not used for computing the carrier power;
computing said maximum normalized symbol correlation energy over all symbols of the Stop Waveform by forming a normalized symbol correlation energy sequence, by taking a magnitude-squared of each of the symbol-level correlations, for each symbol interval, corresponding to said optimum timing offset, and dividing by a received signal power over the same symbol interval, where the denominator term uses a timing offset corresponding to a nominal symbol timing; and
computing said number of small and said number of large normalized symbol energy values over all symbols of the Stop Waveform, wherein a normalized symbol correlation energy value is said to be small if it is less than said maximum normalized symbol correlation energy scaled by a first predetermined value that is less than unity, and wherein the normalized symbol correlation energy value is said to be large if it is greater than said maximum normalized symbol correlation energy scaled by a second predetermined value that is less than unity.

* * * * *